(12) United States Patent
Gentner et al.

(10) Patent No.: US 12,000,423 B2
(45) Date of Patent: Jun. 4, 2024

(54) LIGHTWEIGHT-CONSTRUCTION FASTENER

(71) Applicant: SFS Group International AG, St. Gallen (CH)

(72) Inventors: Philipp Gentner, Weinsberg (DE); Sascha Costabel, Jettingen (DE)

(73) Assignee: SFS Group International AG, St. Gallen (CH)

( * ) Notice: Subject to any disclaimer, the term of this patent is extended or adjusted under 35 U.S.C. 154(b) by 198 days.

(21) Appl. No.: 17/793,078

(22) PCT Filed: Jan. 15, 2021

(86) PCT No.: PCT/EP2021/050790
§ 371 (c)(1),
(2) Date: Jul. 15, 2022

(87) PCT Pub. No.: WO2021/144411
PCT Pub. Date: Jul. 22, 2021

(65) Prior Publication Data
US 2023/0040255 A1   Feb. 9, 2023

(30) Foreign Application Priority Data

Jan. 17, 2020   (EP) ..................... 20152361

(51) Int. Cl.
*F16B 37/04*   (2006.01)
(52) U.S. Cl.
CPC .......... *F16B 37/044* (2013.01); *F16B 37/043* (2013.01); *F16B 37/04* (2013.01)

(58) Field of Classification Search
CPC .......... F16B 37/00; F16B 37/02; F16B 37/04; F16B 37/041; F16B 37/043; F16B 37/044; F16B 37/045; F16B 39/14; F16B 41/002
(Continued)

(56) References Cited

U.S. PATENT DOCUMENTS 5,423,646 A   6/1995 Gagnon
6,918,725 B2*  7/2005 Gauron ................. F16B 37/043
                                            411/112

(Continued)

FOREIGN PATENT DOCUMENTS

EP   0407282   6/1990
EP   3263918   1/2018
(Continued)

*Primary Examiner* — Roberta S Delisle
(74) *Attorney, Agent, or Firm* — Volpe Koenigs

(57) ABSTRACT

A lightweight-construction fastener (10) having a one-piece clip body (20) made of plastic and a clip nut (40). The clip body has the basic shape of a clamp, having two opposite legs (22, 24) extending in the longitudinal direction and a cage (28) in which the clip nut is floatingly mounted. The clip nut in turn has a nut base (42) which is substantially planar. A main part (44) is structured on the nut base and has a cover surface (41) and a plurality of side walls (51, 51') which extend between the nut base and the cover surface. The side walls of the main part preferably have a convex curvature and the cage has correspondingly designed concave walls. The sizing is such that the convex-concave surface pairs act as torque supports during use of the lightweight-construction fastener.

16 Claims, 2 Drawing Sheets

(58) Field of Classification Search
USPC ....... 411/103, 172, 174, 182, 427, 432, 511, 411/522–523
See application file for complete search history.

(56) References Cited

U.S. PATENT DOCUMENTS

| | | | |
|---|---|---|---|
| 7,648,319 B1* | 1/2010 | Ochoa | F16B 37/044 |
| | | | 411/174 |
| 7,896,596 B2* | 3/2011 | Rausch | F16B 37/041 |
| | | | 411/174 |
| 7,959,392 B2* | 6/2011 | Cooley | F16B 33/006 |
| | | | 411/332 |
| 8,177,466 B2 | 5/2012 | Csik et al. | |
| 8,231,317 B2* | 7/2012 | De Gelis | F16B 5/0266 |
| | | | 411/188 |
| 2004/0202523 A1* | 10/2004 | Csik | F16B 37/043 |
| | | | 411/112 |
| 2018/0094670 A1* | 4/2018 | Costabel | F16B 37/044 |
| 2018/0094671 A1* | 4/2018 | Costabel | F16B 37/043 |
| 2020/0124079 A1* | 4/2020 | Stewart | F16B 37/044 |

FOREIGN PATENT DOCUMENTS

| | | |
|---|---|---|
| EP | 3301309 | 11/2020 |
| FR | 2934336 | 1/2010 |

* cited by examiner

LIGHTWEIGHT-CONSTRUCTION FASTENER

TECHNICAL FIELD

The present invention deals with lightweight-construction fasteners which are referred to in the industry as clips or by the English term clip nuts. In principle, such a clip consists of a clamp-shaped clip body and a clip nut mounted movably thereon. The present invention relates, among other things, to a lightweight-construction fastener with a clip body composed completely of plastic.

BACKGROUND

Lightweight-construction cladding which has to be detachably fastened is often used in automotive construction and in the aerospace industry. In order to avoid machining steps during final mounting, such e.g. plate-shaped cladding elements are pre-bored and provided with clips. The fasteners to other cladding elements or structurally supporting elements then engage in their screw elements during final mounting. The plate-shaped elements or components are in this case often lightweight-construction wall elements or sandwich panels which, for weight reasons, are usually composed of two outer layers (composed of plastic or aluminum) which have a honeycomb-type stiffening element glued therebetween.

PRIOR ART

Clips are fundamentally known from the prior art. U.S. Pat. No. 8,177,466 (US 2008/0310931 A1) shows a two-piece clip with a clamp-shaped, resilient clip body and a clip nut mounted in a snap retainer.

U.S. Pat. No. 5,423,646 describes a clip with a clip body composed of metal, on one leg of which a sleeve bearing an internal thread is fixedly installed.

EP 0 407 282 A1 shows a clip composed of a metal bracket with a clamping holder, one clip nut with a widened supporting base facing the inner region of the clamp.

All three clip designs have in common that precautions were taken in order to prevent a co-rotation of the nut during screwing in of the screw. U.S. Pat. No. 5,423,646 with its fixed threaded sleeve solves this problem as a result of the rigid connection, but also offers no comfort during the placing process because the nut has no play. In the case of the two other documents, the torques or forces which occur are transmitted via lugs, journals or stop surfaces from the clip nut to the clip body and discharged from this in turn into the component on which the clip was placed. These torque supports are only of importance during the tightening of the fastener into the clip nut, and for actual fastening of the components to one another, they do not play any role. The provision of such lugs, journals or stop surfaces increases both the complexity of the clip nut and also the outlay during mounting of clip nut and clip body.

SUMMARY

The object of the present invention is to reduce the above-mentioned disadvantages of the prior art and in particular present a clip which can have improved properties in terms of mounting, handling and production.

This object is achieved by a lightweight-construction fastener which is in principle in two parts composed of clip body and clip nut with one or more of the features disclosed herein. Further variants and exemplary embodiments are described below and in the claims.

A lightweight-construction fastener according to the invention comprises a one-piece clip body composed of plastic and a clip nut. As in the prior art, the clip body has the basic form of a clamp, with two opposite legs extending in a longitudinal direction and a web which connects two opposite leg ends. The two surfaces which face one another of the legs and the web thus describe or delimit a receiving space for a plate-shaped component.

The term receiving space should be understood as the volume which is described by the boundaries of the two legs and the web. The term "inner side" or "inner region" in the case of the clip body or lightweight-construction fastener also relates to this inner region between the two legs of the clip body. The terms "top" and "bottom" relate to the normal representation of a clip similar to the representation in FIG. 1.

The clip nut has in turn a nut base which is configured to be substantially plate-shaped with a flat, planar base surface facing towards the inside of the clamp. A main body is built up on the nut base (to be more precise: on the (upper) side opposite the base surface) with a covering surface as well as a multiplicity of side walls which extend between nut base and covering surface.

Put more simply, the nut base thus approximates an irregularly configured flange which terminates the main body at its lower end.

The main body preferably has a substantially polygonal cross-section parallel to the nut base. From a conventional point of view, the horizontal cross-section therefore has an irregular form, preferably as a polygon. Following its function as a clip nut, the main body has a central middle opening which extends through the nut base, the main body and the covering surface (vertical passage opening).

The first leg of the clip body bears a cage comprised of multiple wall elements in which the clip nut is mounted to be movable in a floating manner. The term cage refers to normal receiving or movable mounting of the clip nut in the case of clips. The cage holds the clip nut with play. For this purpose, this cage has at least two holding openings.

The second leg of the clip body is configured toward the inside of the clamp as a tongue-shaped, flat bearing surface. The term bearing surface thus refers to the contact surface with a component onto which the lightweight-construction fastener is pushed.

Both legs, and indeed the first leg in the region of the cage and the second leg in the region of the tongue, have in each case an opening which are flush with the central middle opening of the clip nut arranged in the cage.

The first leg is furthermore configured so that the base surface of the clip nut points toward the inside of the clamp and is formed as a bearing surface for direct contact with the plate-shaped component. In most embodiments of the prior art, the clip nut is retained as a component on the upper side of a leg and thus presses, in the installed state, on the leg. This therefore acts as a washer for the clip nut. In the case of the present invention, the first leg is embodied so that the nut base forms part of the inner side of the first leg. Ideally, the rest of the inner surface of the leg is embodied so that it is two-dimensionally flush with the base surface of the nut base. It can alternatively also be offset slightly two-dimensionally so that in each case of use the base surface of the nut base can bear against the component.

The main body of the clip nut furthermore has at least two pin-shaped lugs which engage in the corresponding openings of the wall elements of the cage. These lugs are preferably arranged on opposite sides of the main body and are dimensioned such that they have play in the associated openings. The lugs have, in interaction with the openings of the cage, the main function of loss prevention and to a lesser extent that of a torque support. This transmission of force or torque during screwing of a fastener into the central middle opening is primarily performed by the side walls of the main body onto the wall elements of the cage.

A number of n side walls of the clip nut main body are preferably concavely arched, wherein n=>3. Since the form of the horizontal cross-section of the main body was described as a polygon, a hexagon with e.g. 3 or 4 sides which are concavely (inwardly) arched could therefore satisfy this condition. Just like an octagon with e.g. 4 or 6 concave sides. It can expressly be provided that further straight or convex side walls can also be provided between concave (side) wall surfaces. These wall surfaces can continuously transition into one another or be separated by edges. The interaction with the wall elements of the cage is decisive.

A lightweight-construction fastener according to the invention will therefore have at least n inwardly directed wall elements of the cage which are inwardly convexly arched. The term "inwardly" is to be understood as "facing the region outlined by the wall elements".

In a preferred embodiment, the side walls of the clip nut main body and the wall elements of the cage are opposite one another in pairs. In further preferred embodiments, the arching of the side walls or wall elements will follow the form of conical sections, i.e. can be described in the horizontal cross-section (parallel to the base surface) as circular portion-shaped, elliptical, parabolic or hyperbolic. The arching is constructively preferably embodied in this case as circular arcs. In one embodiment which is preferred in terms of construction and manufacturing technology, the arches will thus use the same geometrical basic form. Yet further preferably, the radii of the circular arcs for the concave side walls or convex wall elements can be selected to be of substantially the same magnitude.

If one considers the features described above jointly, the outer form of the clip nut side walls is complementary to the wall elements of the cage, external arching hits internal arching. If therefore a fastener is connected to the clip nut, the clip nut is initially co-rotated by the fastener to a certain degree until the rotational movement is hindered. The floating mounting of the clip nut in the case does indeed make available this degree of freedom in a planned manner. In the prior art with lugs and projections as torque supports, these serve to discharge force. In the case of the present invention, this is achieved by the contact of the side walls/wall elements. The contact will arise automatically depending on the alignment or orientation of fasteners, clip nut and cage. The contact surface could accordingly be performed simultaneously via one or more surfaces. As a result of the significantly larger contact surfaces in comparison with the webs or lugs in the prior art, more gentle discharge of force is achieved, which enables an optimized design of the overall lightweight-construction fastener.

In a preferred embodiment, the central middle opening of the clip nut is equipped with an internal thread. Alternatively or as an equivalent to a screw thread, other types of fastening can also be provided, e.g. bayonet fastenings, snap holders, rotary clamp fastenings.

It has been shown that the clip nut is manufactured in one piece from plastic, preferably a thermoplastic, in particular PEEK. Aggregates such as glass fibers, carbon fibers and other, above all injection molding-compatible aggregates can be used in order to adjust the rigidity of the clip nut as desired or required.

In one particular embodiment, the run-out of the thread facing the covering surface can be configured so that a screwed-in fastener is secured in a clamping manner. The methods known in the prior art can be used here by virtue of the fact that, for example, the thread ridges are slightly widened, the thread pitch is changed or the thread is not fully molded. Alternatively or additionally, it would also be conceivable to provide the thread run-out with applied coatings, adhesives or other material layers in order to increase the resistance in the thread end region and thus secure the screw connection. It has been shown that the embodiment of the thread in plastic is possible without any problems in the case of selection of the corresponding rigidity.

In a further embodiment, the nut base can be configured so that it has, on its upper side facing away from the base surface, supporting regions which have a concave arching and are configured so that they enable a rolling movement or tilting of the clip nut along the first leg. As mentioned above, the lugs on the main body which are mounted in the associated openings of the cage primarily serve to prevent loss. The arched upper side of the nut base or the supporting surfaces of this upper side face the lower side of the cage or the first leg as a result of the flange-like overhang of the main body. As mentioned above, the base surface does form a direct supporting surface for the component to be secured, therefore the cage consequently lies on the arched upper side of the nut base or the supporting surfaces of this upper side. As a result of the selected form (semicircular arching), additional tilting movability is generated between the first leg/cage lower side and the clip nut.

A chamfer tapered toward the base surface can furthermore be provided on the nut base. This is preferably fitted on the side of the clip nut facing away from the web and supports or facilitates the sliding of the lightweight-construction fastener onto the component.

It can furthermore be provided that the nut base has, on the edge opposite the chamfer, a stop edge. If the clip nut is mounted in the cage (in other words: correctly installed), an emergency bearing surface is generated spaced apart parallel to a mating surface opposite the clip body.

In an analogous manner to the clip nut, the clip body can be manufactured in one piece from plastic, preferably a thermoplastic, in particular PEEK. In accordance with its purpose as a clamp, the clip body can preferably be embodied in one piece as a 2-component injection molded part, wherein the first plastic component is selected to be more elastic than the second. The adjustment of the rigidity or elasticity of the plastic components can be realized in a familiar manner by aggregates such as glass or carbon fibers.

The more elastic component is preferably primarily used in the region of the second leg or the tongue and in the region of the web. Pushing onto the component can thus be realized more easily because tongue and web assist the mounting process in an elastically resilient manner. In contrast, the cage can be given a more rigid structure, for example, in the embodiment with glass-filled PEEK.

BRIEF DESCRIPTION OF THE DRAWINGS

The invention will now be explained by way of example with reference to the attached drawings on the basis of particularly preferred embodiments.

DETAILED DESCRIPTION

Figure 1:
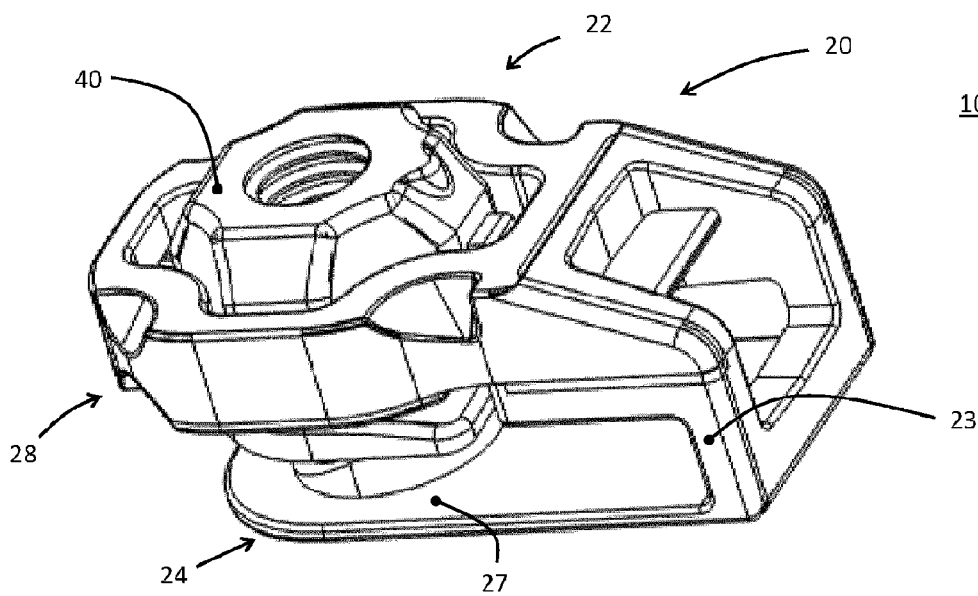
FIG. 1 shows a perspective view of a lightweight-construction fastener according to the invention.

FIG. 1 shows a lightweight-construction fastener 10 obliquely from above in a 3D view. The two main components are clip nut 40 installed in cage 28 which forms the overwhelming part of first leg 22 of clip body 20. First leg 22 is connected via a web 23 to second leg 24 which is functionally formed and referred to as tongue 27. The designations first leg 22, second leg 24 and connecting web 23 are primarily meant functionally. Since clip body 20 is constructed in one piece and these functional regions transition into one another, it is clear to the person skilled in the art that exact delimiting lines are neither expedient nor necessary.

FIG. 1 shows further details which can be provided in the case of a series product from a constructive perspective, such as recesses for material saving, reinforcing ribs and grip surfaces.

Figure 2:
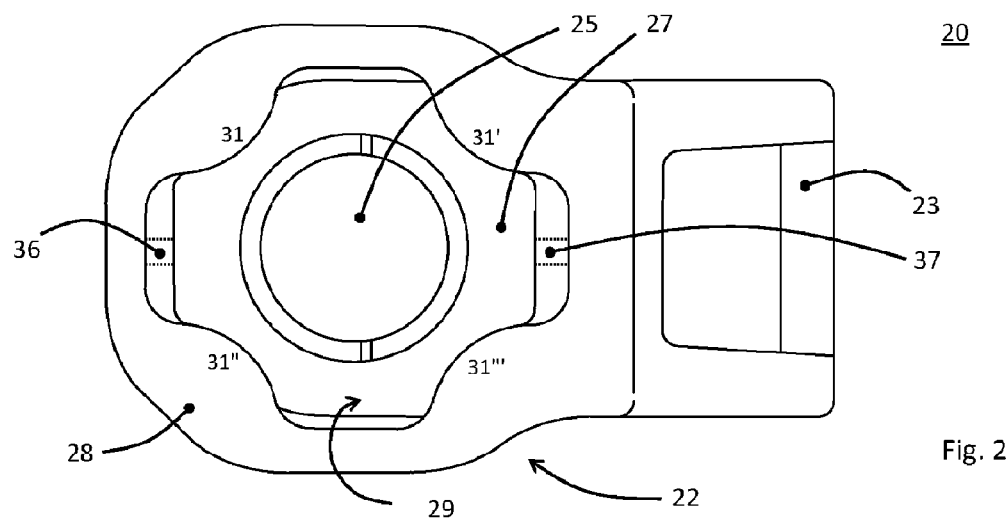
FIG. 2 shows a clip body without a clip nut schematically from above.

FIG. 2 shows a top view "from above" onto clip body 20 of lightweight-construction fastener 10, i.e. onto first leg 22. One can see the structure of cage 28 from above. Wall elements 31, 31', . . . 31''' are apparent as surfaces which are arched convexly inward into the inner region of the cage. The cage has a large opening 29 through first leg 22 which enables a view of parts of second leg 24 or tongue 27. Tongue 27 has a further opening 25. Web 23 is shown in plan view. Two regions of cage 28 have openings 36 and 37 in cage 28, they are indicated by a dashed line opposite one another in the longitudinal axis of first leg 22. These openings are arranged parallel to the plane of extent of first leg 22.

Figure 3:
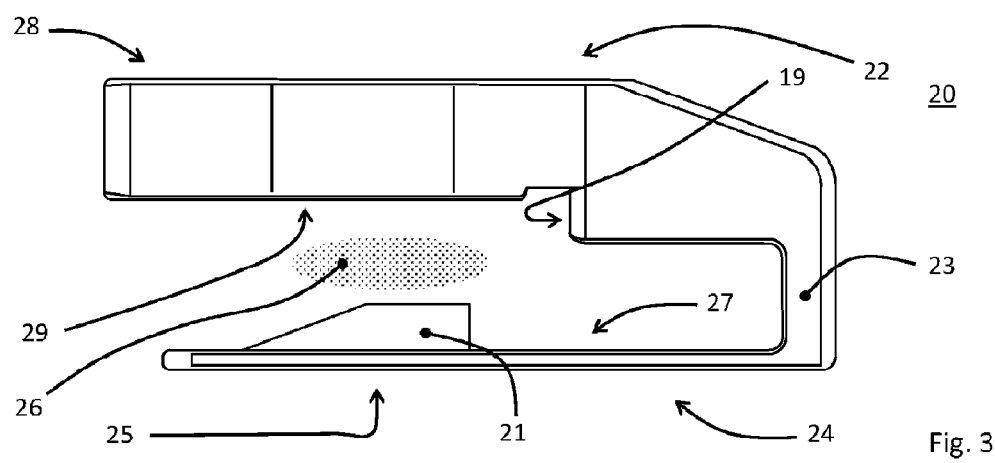
FIG. 3 shows a clip body without a clip nut schematically from the side.

FIG. 3 shows a side view of clip body 20, once again with first leg 22, second leg 24 and connecting web 23. Cage 28 takes up the overwhelming part of first leg 22. Between cage 28 and the transition region to web 23, the leg is equipped with a step oriented toward the inside of the clamp, which step provides an emergency bearing surface 19. FIG. 1 shows the interaction of emergency bearing surface 19 and stop edge 49 (cf. also FIG. 6). Opening 25 in second leg 24 and the position of opening 29 (first leg 22) are indicated by arrows. Opening 25 is surrounded in the region of tongue 27 by a chamfered sleeve portion 21, similar to a collar. This serves to center the lightweight-construction fastener on the opening in the component (not shown here). The chamfering to the introduction opening into receiving space 26 facilitates the pushing of the lightweight-construction fastener onto the component.

Figure 4:
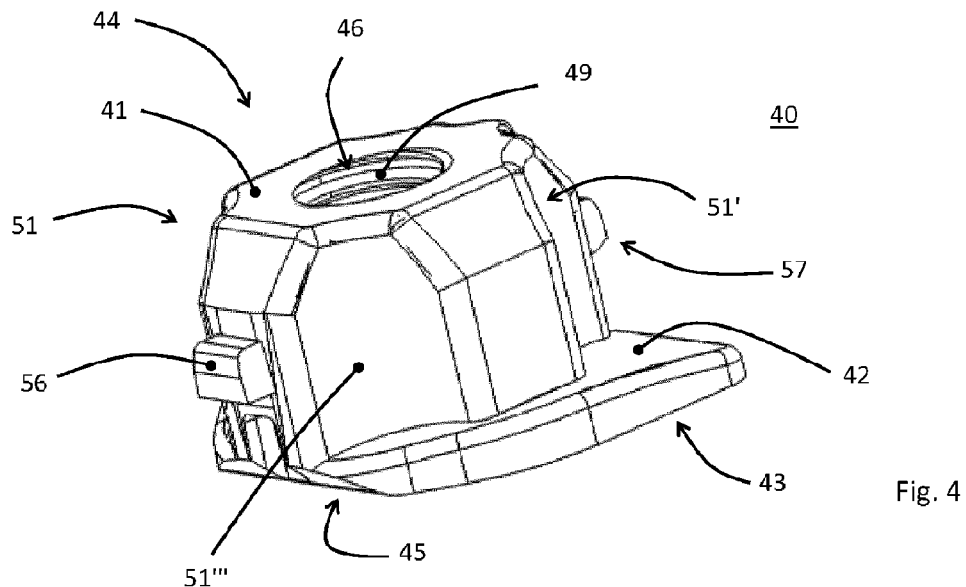
FIG. 4 shows a perspective view of a clip nut.

FIG. 4 shows, in a perspective view, a clip nut 40 as an isolated component. Their main components are nut base 42 and main body 44. Nut base 42 is shown as a substantially flat, plate-shaped base surface 43 with irregularly formed edges. Flat base surface 43 (lower side) transitions at an edge to chamfer 45 described above. Main body 44 is shown as a fundamentally polygonal body, the side walls 51, 51', 51'', . . . of which are concave, interrupted by flat wall portions. The side walls partially transition into chamfers which in turn open into covering surface 41. In the covering surface, central middle opening 46 is shown with its internal thread 49. Two projections or lugs 56, 57 are fitted on the main body, which serves to prevent loss (after mounting in clip body). In the mounted state, they come to lie in openings 36, 37.

Figure 5:
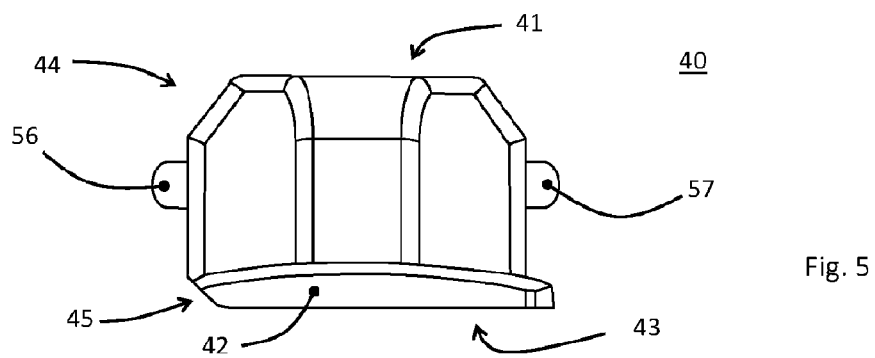
FIG. 5 shows a side view of a clip nut.

FIG. 5 shows a clip nut 40 in a schematic side view. It becomes apparent here that nut base 42 has a flat base surface 43 ("lower side"), while its upper side possesses a convex arching.

Figure 6:
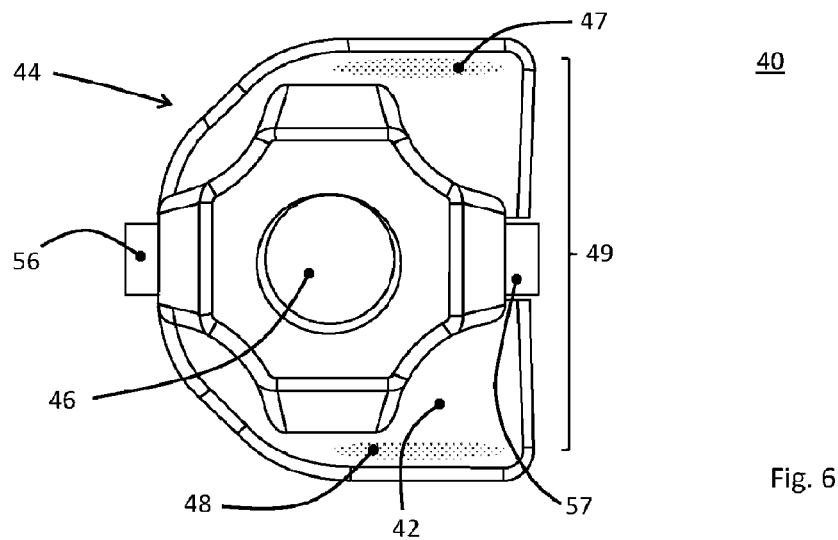
FIG. 6 shows the view of a clip nut from above.

FIG. 6 in turn is a plan view of the clip nut from covering surface 41. The irregularly selected form of nut base 42 is apparent here. As is apparent in the combined view of FIGS. 1 and 6, there are contact regions between the nut base and the lower side of first leg 22 of clip body 20 facing receiving space 26. These supporting regions 47 and 48 are indicated by hatching in FIG. 6. On them, clip nut 40 can perform a rolling movement relative to the clip body, as also described further above, due to the convexly arched surface of nut base 42. Feature 49 designates the stop edge which can interact with emergency bearing surface 19 (in the assembled state).

The features of the invention disclosed in the above description, in the drawings and in the claims can be significant both individually and in any desired, technically expedient or advantageous combination for the achievement of the invention. The embodiment shown in FIGS. 1-6 is a preferred realization form for the described invention. Other configurations of the outer shaping, as described in the claims, as well as their technical equivalents, are also included.

The invention claimed is:

1. A lightweight-construction fastener, comprising:
a one-piece clip body formed of plastic and having a basic form of a clamp
with two opposite legs extending in a longitudinal direction
and a web which connects two opposite leg ends;
a receiving space for a plate-shaped component between the legs which is delimited on one side by the web;
a clip nut
which has a nut base configured to be substantially plate-shaped with a flat, planar base surface facing toward an inside of the clamp;
a main body built up on the nut base having a covering surface as well as a multiplicity of side walls which extend between nut base and covering surface;
the main body has a substantially polygonal cross-section parallel to the nut base;
a central middle opening extends through the nut base, the main body and the covering surface;
a first leg of the clip body has a cage comprised of multiple wall elements in which the clip nut is mounted to be movable in a floating manner;
the cage has at least two holding openings,
the second leg toward the inside of the clamp is configured as a tongue-shaped, flat bearing surface, and
the first leg in a region of the cage and the second leg in a region of the tongue have in each case an opening which are flush with the central middle opening of the clip nut arranged in the cage;
the first leg is configured so that the base surface of the clip nut points toward the inside of the clamp and is formed as a bearing surface for direct contact with the plate-shaped component; and
the main body of the clip nut has at least two pin-shaped lugs which engage in the openings of the wall elements of the cage.

2. The lightweight-construction fastener as claimed in claim 1, wherein the multiplicity of side walls includes a number of n side walls of the clip nut main body that are concavely arched, wherein n=>3.

3. The lightweight-construction fastener as claimed in claim 2, wherein at least n inwardly directed wall elements of the cage are inwardly convexly arched.

4. The lightweight-construction fastener as claimed in claim 3, wherein the side walls of the clip nut main body and the wall elements of the cage are arranged opposite one another in pairs.

5. The lightweight-construction fastener as claimed in claim 3, wherein at least one of the concavely arched side walls or the convexly arched wall elements are arched in a form of conical sections.

6. The lightweight-construction fastener as claimed in claim 3, wherein the concavely arched side walls or the convexly arched wall elements are arched in a form of circular arcs.

7. The lightweight-construction fastener as claimed in claim 6, wherein radii of the circular arcs for the at least one of the concavely arched side walls or the convexly arched wall elements are selected to be substantially the same.

8. The lightweight-construction fastener as claimed in claim 1, wherein the central middle opening of the clip nut has an internal thread.

9. The lightweight-construction fastener as claimed in claim 8, wherein a run-out of the thread facing the covering surface is configured so that a screwed-in fastener is secured in a clamping manner.

10. The lightweight-construction fastener as claimed in claim 1, wherein the clip nut is manufactured in one piece from plastic.

11. The lightweight-construction fastener as claimed in claim 1, wherein the nut base has, on an upper side thereof facing away from the base surface, supporting regions which have a concave arching and are configured to enable a rolling movement or tilting of the clip nut along the first leg.

12. The lightweight-construction fastener as claimed in claim 1, wherein the nut base has a chamfer tapered toward the base surface.

13. The lightweight-construction fastener as claimed in claim 1, wherein the nut base has, on an edge opposite the chamfer, a stop edge which, with the clip nut is mounted in the cage, is arranged spaced apart parallel opposite an emergency bearing surface.

14. The lightweight-construction fastener as claimed in claim 1, wherein the clip body is manufactured in one piece from plastic.

15. The lightweight-construction fastener as claimed in claim 1, wherein the clip body is embodied in one piece as a 2-component injection molded part, and a first plastic component is selected to be more elastic than a second plastic component of the clip body.

16. The lightweight-construction fastener as claimed in claim 15, the more elastic component is primarily used in a region of the second leg or the tongue and in a region of the web.

* * * * *